Sept. 5, 1950  M. J. MURPHY  2,521,245

EGG, FRUIT, AND VEGETABLE PEELER

Filed Nov. 26, 1946

Inventor

Martin J. Murphy

By *Clarence A. O'Brien and Harvey B. Jacobson*
Attorneys

Patented Sept. 5, 1950

2,521,245

UNITED STATES PATENT OFFICE 2,521,245

EGG, FRUIT, AND VEGETABLE PEELER

Martin J. Murphy, Greeley, Nebr.

Application November 26, 1946, Serial No. 712,415

1 Claim. (Cl. 30—280)

The present invention relates to what is believed to be a novel and improved multiple purposed peeler, that is, a hand-grasped and manipulated implement for use in kitchens and the like and adapted to penetrate, sever and peel such edibles as fruits, vegetables and hard boiled eggs.

It goes without specific mention that I am sufficiently conversant with the state of the prior art to be aware of the fact that many and varied types of so-called ribbon-type skin cutting and removing peelers have been patented. Despite such setting and the accomplishments of those already in the field, I have worked out and structurally perfected what is believed to be an implement of such form and structural characteristics as to better fulfill the requirements of manufacturer and the trade in general.

In keeping with the principles governing the production of the instant invention, it has been found expedient and practicable to utilize an unusually simple and practical device which may be conveniently grasped in the hand of the user while holding the article of food in the other hand and worked over the surface to penetrate and sever the skin or covering in ribbon-like strips, thus to produce a clean-cut and well finished result.

It is another object of the invention to provide an instrument of the type under consideration characterized by means for penetrating the outer layers of the fruit or vegetables to the depth desired, while employing penetrating and cutting means in a manner to protect the hand of the operator, together with means enabling the operator to easily maintain uniform the depth of the cut, whereby to satisfactorily attain the ends desired.

It is another object of the invention to provide a peeler which does not require elaborate instructions for proper use, or a skillful touch and technique to aptly attain the ends desired, the embodiment exemplifying the invention lending itself adaptable to satisfactory and efficient use under practically all conditions and circumstances.

Generally speaking, it is another object to improve upon and reduce the number of parts entering into the finished combination, thereby not only increasing the efficiency of the structural unit as a whole, but also rendering the same economical to manufacture and sell and to otherwise simplify practices of manufacture and sale.

The foregoing and other objects and features and advantages of the invention will become more readily apparent from the following description and the accompanying illustrative drawings.

In the drawings, wherein like numerals are employed to designate like parts throughout the views—

Figure 1:
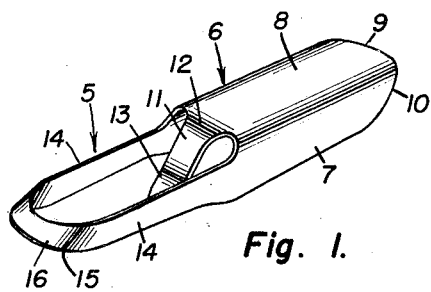
Figure 1 is a perspective view of a hand-type peeler constructed in accordance with the principles of the instant invention.
Figure 2:
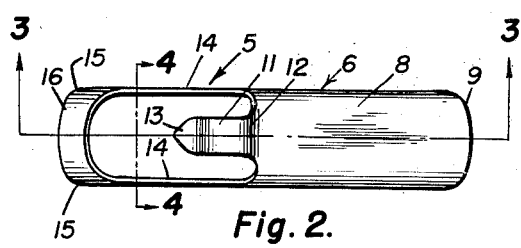
Figure 2 is a top plan view of the same.
Figure 3:
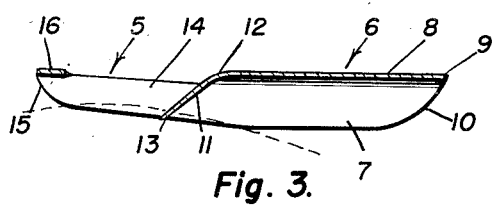
Figure 3 is a central longitudinal sectional view taken on the plane of the line 3—3 of Figure 2, looking in the direction of the arrows.
Figure 4:
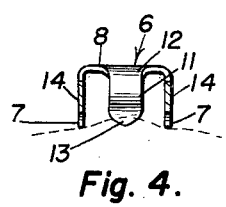
Figure 4 is a transverse or cross-sectional view taken on the plane of the line 4—4 of Figure 2, looking in the direction of the arrows.

Briefly, the device is formed from a suitable blank of metal which is struck out and cut and formed to produce an article of the type shown.

The implement in its preferred form is elongated and channel-shaped in cross-sectional form and for purposes of better visualizing its essential characteristics is characterized by front and rear portions 5 and 6. The rear portion 6 is in the nature of a miniature sled, as it were, the same being adapted to be grasped in the hand of the user and being characterized by spaced parallel runners 7, an imperforate web 8, the rear end being of arcuate form as at 9 and the rear ends of the runners being curved and up-turned as at 10.

The forward half portion or part 5 of the implement is in the nature of a guide for steering and piloting the implement forwardly and over the curved or other surface of the article being peeled. It serves as a guide for the penetrating, cutting and skin stripping prong 11. Before discussing the guide it is advisable to cover the prong and in this connection it will be observed that it is mounted on the forward central end portion of the web 8, that it is relatively narrow and of finger-like form and is bent down from the point 12. The lower extremity of said prong is of V-form as at 13 and this provides the penetrating, skin-severing, and peel uplifting means. This penetrating and ribbon-peeling prong advances over the surface of the skin to be peeled as a "sled" 8 follows behind it and glides over the skin. The forward guiding and steering means 5 surrounds the prong in the form of a frame and it too has side runners 14 in alignment with the already mentioned runners 7. The entire part 5 is slightly offset, that is, in an upward direction with respect to the longitudinal axis of the sled 8, this to facilitate feeding the prong and maneuvering it in such manner as varying conditions present. The extremities of the front runners 14 are curved up as at 15 to provide the desired "hiking" and forward piloting results. Also, it will be noted that the extreme forward ends of said front runners are connected together by a relatively narrow cross-strap 16 whose front edge is properly rounded to prevent the same from gouging into the article being peeled.

It follows that the implement may be pictured as comprising a miniature runner-equipped sled at the rear, the same having a down-bent and properly angled severing and peeling prong at the front and said prong being situated within the confines of the guiding frame in advance of the sled with the guiding frame being offset in an upward and forward direction and also having runners providing continuations of the rear runners. The guide frame pilots the implement over the surface and facilitates rocking and handling it, the sled on the rear providing the desired riding and gliding means, and the prong does the desired nipping and lifting and turning of the peel so that the peel rides rearwardly or in the direction of the operator through the opening defined by said guiding frame 5.

Experience has shown that the device is primarily an effective egg-shell remover for hard boiled eggs, is secondarily a fruit skin peeler (especially on smooth and rounded fruits such as oranges) and; thirdly is a vegetable peeler, but not for all varieties. So, experience will have to be the guide in best determining its uses in one's kitchen.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and re-arrangement of parts may be resorted to in actual practice so long as no departure is made from the invention as claimed.

What is claimed is:

An egg peeler of the class described comprising a pair of spaced parallel runners, a relatively narrow cross-strap connecting corresponding end portions of said runners, a relatively flat plate connecting the median and opposite corresponding end portions of said runners, the inner end of the said plate being spaced from said cross strap and cooperating with the latter in defining an opening through which peelings may be unobstructedly cleared and disposed of, and the inner end of said plate being provided with a pointed shell penetrating and peeling prong, the pointed end of said prong being spaced from said plate, occupying an obliquely inclined position between adjacent portions of said runners and having its pointed end projecting to a plane slightly beyond the plane of the adjacent edge portions of said runners.

MARTIN J. MURPHY.

REFERENCES CITED

The following references are of record in the file of this patent:

UNITED STATES PATENTS

| Number | Name | Date |
| --- | --- | --- |
| 881,841 | Bahn | Mar. 10, 1908 |
| 1,644,119 | Fowler | Oct. 4, 1927 |